(12) United States Patent
Gates et al.

(10) Patent No.: US 11,148,959 B2
(45) Date of Patent: Oct. 19, 2021

(54) PROCESS TO OBTAIN THIN LAYERS OF DRIED AND CONSOLIDATED MATURE FINES TAILINGS

(71) Applicant: CEDA Services and Projects LP, Calgary (CA)

(72) Inventors: Ian D. Gates, Calgary (CA); Jingyi Wang, Calgary (CA); Spencer Fried, Calgary (CA); Yi Su, Calgary (CA)

(73) Assignee: CEDA Services and Projects LP, Calgary (CA)

( * ) Notice: Subject to any disclaimer, the term of this patent is extended or adjusted under 35 U.S.C. 154(b) by 170 days.

(21) Appl. No.: 16/121,153

(22) Filed: Sep. 4, 2018

(65) Prior Publication Data

US 2019/0071323 A1 Mar. 7, 2019

Related U.S. Application Data

(60) Provisional application No. 62/554,416, filed on Sep. 5, 2017.

(51) Int. Cl.
| | |
|---|---|
| *C02F 1/12* | (2006.01) |
| *B01D 1/16* | (2006.01) |
| *C02F 1/52* | (2006.01) |
| *C02F 11/16* | (2006.01) |
| *C02F 103/10* | (2006.01) |
| *C02F 11/14* | (2019.01) |

(52) U.S. Cl.
CPC .................. *C02F 1/12* (2013.01); *B01D 1/16* (2013.01); *C02F 1/5236* (2013.01); *C02F 11/14* (2013.01); *C02F 11/16* (2013.01); *C02F 2103/10* (2013.01)

(58) Field of Classification Search
CPC ........................................................ C02F 1/12
See application file for complete search history.

(56) References Cited

U.S. PATENT DOCUMENTS

| | | | | |
|---|---|---|---|---|
| 3,827,567 A | * | 8/1974 | Rundqvist | B01D 25/28 210/414 |
| 4,323,424 A | * | 4/1982 | Secunda | F26B 3/12 159/48.1 |
| 6,190,498 B1 | * | 2/2001 | Blagborne | B01D 1/16 159/16.1 |
| 2013/0175223 A1 | * | 7/2013 | Rennard | C02F 11/121 210/710 |
| 2016/0272525 A1 | * | 9/2016 | Moffett | E02D 3/12 |

* cited by examiner

*Primary Examiner* — Peter Keyworth
(74) *Attorney, Agent, or Firm* — Michael A. Bondi; Moss & Barnett

(57) ABSTRACT

A process to treat fines tailings generated from mining operations, wherein tailings material is sprayed onto a solid substrate as a thin layer and allowed to dry. The spray may be re-applied on top of the dried tailings film leading to multiple layers of dried tailings solids. The method may yield a solid, dry, and consolidated tailings material.

12 Claims, 13 Drawing Sheets

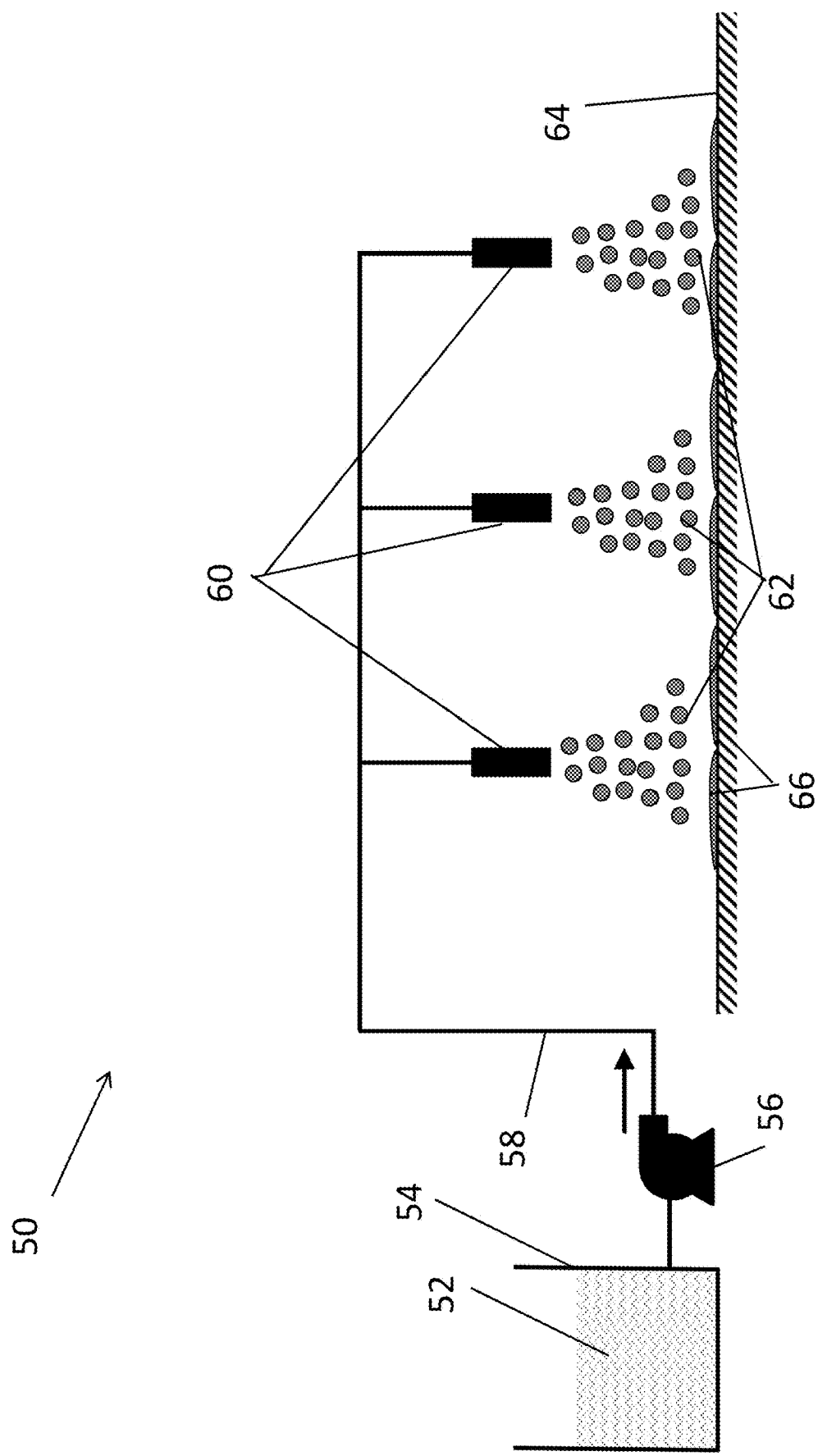

PROCESS TO OBTAIN THIN LAYERS OF DRIED AND CONSOLIDATED MATURE FINES TAILINGS

REFERENCE TO RELATED APPLICATION

This application claims priority to Provisional Applic. No. 62/554,416, filed on Sep. 5, 2017, the contents of which are incorporated herein by reference.

TECHNICAL FIELD

The technical field relates to treatment of tailings materials from mines.

BACKGROUND

Fines tailings from mining operations are a composite material consisting of a mixture of water, clay, sand, and residual hydrocarbons.

In oil sands mining operations, tailings material is generated during the oil sands extraction process where the clay and other solids are separated from the oil sand to yield bitumen.

The tailings, in typical practice, are deposited into large ponds where the sand and larger particulates (>0.25 mm) settle to the bottom of the system whereas the next densest material, the fines tailings (which are sometimes referred to as "tailings" herein), accumulates in a middle layer above the sand layer and below a water-rich interval. The water can contain fine suspended particles that remain in suspension for extended time scales. The tailings materials that enter the tailings pond from the oil sands mining processing plant also contain oil. In oil sands mining operations, up to 1% of the material that is placed in the tailings pond is oil. This oil remains within the tailings material in the pond and is not produced from the pond.

The key challenge faced by oil sands mining operations from an environmental stance is the accumulation of tailings ponds—they are massive and have the potential for leaks of the water contained in the ponds to the environment. Also, the fines can remain suspended for decades or longer thus preventing the separation of water from the tailings over practical time scales.

The intention of all oil sands mine operations is that the tailings ponds are returned to their original state (e.g. boreal forest) that they were in prior to the mining operation.

The key challenge for treatment of tailings is that the porosity is relatively large and the pore space is saturated with water and a small amount of oil but the permeability is very low (water is bound to the clays through electrostatic and van der Waals forces) and thus, water separation from the tailings material is difficult. It is desired that the tailings is consolidated by having the water removed from the media.

Given the nature of tailings with its fine clay particles and low permeability, the amount of time it will take for natural consolidation of tailings under gravity force is on the order of tens to hundreds or even thousands of years depending on the size of the clay particles. This means that practically, there is no present commercial solution for these tailings ponds to consolidate them to enable their return to their original state. Tailings consolidation is a required step for reclamation of the tailings ponds.

SUMMARY OF THE INVENTION

The technology described herein seeks to accomplish consolidation of tailings by using a spray process. In some embodiments of the present invention, the spray from the devices described herein emit micrometer to millimeter to centimeter scale droplets of tailings into the air which then fall and accelerate under gravity to a solid substrate. The solid substrate can be the ground or any solid backing that the tailings material is sprayed on. This includes horizontal solid sheets (for example, ground, soil, gravel, sand, rock, wood, plastic sheets, and conveyer belts). This also includes vertical walls (for example, rock, wood, plastic sheets, and conveyer belts).

In some embodiments of the present invention, the spray is jetted from a spray nozzle onto the ground (or other solid substrate).

The inertial impact of the spray droplet on the ground (or other solid substrate) separates the water and compresses the tailings droplet into a flat and thin pancake-like form. The "pancake" as described herein is the layer of wet tailings material that is formed on the solid substrate; in some cases, it is also referred to herein as a layer on the solid substrate. The pancake is rendered thin enough and due to the separation of water, the pancake dries relatively quickly within minutes to hours. In this manner, the pancakes form a layer of dried tailings on the ground. The spray is emitted on the area multiple times for an extended period of time to continuously build multiple stacked layers of tailings pancakes on the ground with a drying period in between each spray. If the layer of sprayed tailings material is thin enough, for example on the order of 10 to 200 microns thick, the layer may dry within minutes depending on the conditions.

Prior to being sprayed, the tailings material may be mixed with additives that help with consolidating the tailings and rejecting water. These additives can be gases, salt solutions, acids or bases, polymers, and/or flocculants.

In some embodiments, when sprayed, the tailings material may be jetted through a nozzle in combination with a gas which atomizes the tailings material into droplets, typically in diameter between 1 micron and 5 cm. In one embodiment of the process where droplets are sprayed into the air and gravity provides sufficient inertia for the droplets to form thin pancakes on the solid substrate, the droplets can be between 0.5 mm and 5 cm in diameter with a preferred range from 0.5 mm to 2.5 cm. In another embodiment of the method where droplets are spray jetted directly onto the solid substrate to form thin pancakes on the solid substrate, the droplets can be between 1 to 500 microns in diameter with a preferred range from 1 to 200 microns.

One aspect of the described process is that the impact of the droplet on the ground (or solid substrate) acts to provide sufficient force to not only promote the separation of water from the solid but also the force is sufficient to spread the droplet on the ground yielding a flat pancake of reduced thickness. The separated water evaporates from the ground (or other solid substrate) or flows away from the pancake by gravity. Thus, the described process yields first, a separation of water and tailings, and second a consolidated and flattened tailings pancake. The thin pancake also dries relatively quickly since it is thinner (i.e., mass transfer limitations are relatively small) and spread out over the impact area. Materials contained in the tailings mud are trapped within the dried matrix of the tailings layer. This includes oil and additives that were added to the tailings material prior to spraying.

When the tailings material is sprayed onto the ground (or other solid substrate), if the layer is less than about 200 microns thick, the layer may dry within minutes at standard conditions (1 atmosphere and 15.5° C.). A new sprayed layer can then be applied on top of the dried layer. With repeated applications, the total thickness of the sprayed layers can be taken to any desired value so that the composite layer is sufficiently strong enough to support soil and trees and plants placed on top of the composite layer.

Given the environmental challenges of tailings ponds faced by mine operators, there is an ongoing need for effective and economic processes to de-water and consolidate and dry tailings materials. The consolidation of tailings as described herein and subsequent removal of water may enable a more rapid conversion of these tailings ponds to their original state in a practical time frame of a few years. It is preferable to consolidate the tailings to a particular strength because after reclamation, soil and trees and plants will be placed on top of the reclaimed tailings layer and the layer should not fail mechanically.

The originality of the method lies in the addition of inertial force (when the droplet hits the ground) for separating water and consequent spreading of the tailings drop into a thin pancake on the ground thus enabling relatively rapid drying of the pancake. The inertial force can originate from gravity (larger drops between 0.5 mm and 5 cm) or a jet from a nozzle (smaller drops between 1 and 500 microns).

In general, tailings ponds consist of three layers. The bottommost layer consists mostly of sand and large particles (size >0.25 mm) that fall to the base of the pond under the action of gravity. The middle layer consists of mature fines tailings, a material that resembles yogurt, that contains a large amount of water and some residual oil trapped within the interstitial space of clays and fine sand. The topmost layer consists of mostly water with very fine solids suspended within the water.

The present specification describes some exemplary methods to consolidate tailings from mining operations to a fraction of their present size by issuing the tailings material with gas through a spray device, for example a nozzle, to create a spray with tailings droplets that are from order of microns to millimeters to centimeters in size. The spray device ejects the tailings material as droplets into the air after which they impact a solid substrate such as the ground.

In one embodiment (large drop embodiment), the droplets are large (0.5 mm to 5 cm in diameter) and can be ejected generally vertically upward into the air after which they fall to the ground (or other solid substrate) and impact the ground. In this case, the resulting thickness of the layer (pancake) after impact on the solid substrate (or ground) is between 100 microns and 3 mm with preferred range from 100 microns to 1 mm.

In another embodiment (small drop embodiment), the droplets are small (1 to 500 microns) and are ejected generally vertically downwards from a nozzle to impact the ground (or other solid substrate). In this case, the resulting thickness of the layer (pancake) after impact on the solid substrate (or ground) is between 10 and 500 microns with preferred range from 10 to 200 microns.

Due to contact of the droplets with the air, the droplets start to dry when they are emitted into the air. At some point, the droplets impact the ground (or other solid substrate). When the droplets impact the ground (or other solid substrate), the impact causes the droplets to spread on the solid ground and due to the inertial force of the impact, some fraction of the water contained in the droplet is liberated from the tailings solids in the splatted droplet (the tailings pancake) due to the density difference between the water and solid phases in the tailings material. The exposure of the liberated water to the air allows further drying of the solid tailings. The pancake is relatively thin, preferably, 100 microns to 3 mm (for large droplet embodiment) to 10 to 500 microns (for small drop embodiment) which in turn facilitates further drying of the tailings pancake.

In another embodiment, chemicals are added to the tailings material before it is ejected from the spray device which enable further rejection of water from the tailings material. In this embodiment, in a first step, mixtures of metal halide are added (for example, MX where M=aluminum or iron or sodium or potassium or copper and X=fluoride, chloride, bromide, iodide) solutions with or without acid and/or base (to adjust pH as required) directly into tailings prior to the spray device. The mixture can be injected and mixed directly into the tailings material within the pipe or within a vessel or static mixer upstream of the spray device. In a second step, the mixture of the tailings material and chemicals are emitted from the spray device together with gas to achieve a spray of droplets with the desired average size.

The process described herein could be done as an alternative to thin layer deposition or other processes such as centrifugation, coagulation thickening or water capping processes. One aspect of some exemplary methods is that the equipment required is relatively simple and the area on which the tailings is sprayed can be smaller than thin layer deposition areas since additional forces are brought to bear on de-watering and drying the tailings. In all thin layer deposition processes the tailings are released onto the slope and drain under gravity leading to spreading of the tailings layer on the slope. In other words, gravity is the only force that leads to the thinning of the tailings material layer which, with thicknesses of greater than 10 cm, implies large time scales for drying and water rejection. In the process described herein, the addition of inertial forces to spread the droplets lead to thinner layers which improve the ability to dry and reject water from the pancake of tailings material.

In another embodiment, a cellulose nanocrystal suspension can be added to the tailings material before the spray device. The mixture of the nanocrystal suspension and tailings material is then sprayed on the ground (or other solid substrate).

In another embodiment, a polymer and/or flocculent can be added to the tailings material before the spray device. The mixture of the polymer and/or flocculent and tailings material is then sprayed on the ground (or other solid substrate).

The gas injected can consist of air, carbon dioxide, nitrogen, natural gas, or mixtures thereof. The gas can be added to the tailings material directly or used at the spray nozzle to help atomize and disperse the tailings material into droplets.

Some embodiments comprise the following elements:
a. Ejection of tailings materials through a spray device to yield droplets of tailings material that have sizes ranging from microns to millimeters to several centimeters.
b. In one embodiment, spraying the droplets into the atmosphere to a height such that when the droplets fall to the ground, the impact is sufficient to spread the droplets into a thin layer. The nozzle used to spray the droplets is translated to spray fresh droplets on dry substrate. In other words, the nozzle is moved spatially to spray the droplets on uncoated substrate (or previously coated substrate that has dried or has partially dried). This translation can be done by mechanical means. After the droplets have dried on the solid substrate, a new layer of the spray can be applied on the dried layer.
c. In another embodiment, droplets are sprayed through a nozzle directly onto the ground (or other solid substrate) where the impact is sufficient to spread the droplets into a thin layer. The nozzle used to spray the droplets is translated to spray fresh droplets on dry substrate. In other words, the nozzle is moved spatially to spray the droplets on uncoated substrate (or previously coated substrate that has dried or has partially dried). This translation can be done by mechanical means. After the droplets have dried on the solid substrate, a new layer of the spray can be applied on the dried layer.

d. Continuous spraying of the droplets so that the pancakes overlap as multiple droplets are deposited on the ground. The spray device might be moved along the ground so that there is a time period between subsequent spraying of the tailings material. This enables the pancakes to dry after they have hit the ground.

e. Preparation of a primary solution on surface (preferred embodiment is $FeCl_3$ and $AlCl_3$, 10% concentration) and addition of this solution to the tailings material prior to the spray device. The mixture of tailings material and the solution can be stored in a tank for a period of time prior to spraying. In other embodiments, other materials such as polymers or cellulose nanocrystal or flocculants can be added to the tailings material.

f. Next, gas (preferably nitrogen, carbon dioxide, air or a mixture of these components) can be used with the spray device to aid in the break-up of the tailings flow to achieve droplets of desired size.

g. After the droplets have hit the ground, the pancakes of the tailings material can be left to dry.

In another implementation of the method, gas is not used to help disperse the droplets in the spray device.

The present method can also be used with non-oil sands tailings ponds such as mineral mining tailings ponds.

Prior to the spray device, the tailings material can be stored in a tank and by using gas flotation, any oil in the tailings material can be separated. Also, through gravity segregation, larger tailings material particles can be separated from the tailings material that is subsequently sprayed.

According to one aspect of the present invention, there is provided a method for partially dewatering fluid fines tailings, the method comprising the steps of:

a. transporting the fluid fines tailings to a point vertically spaced above a substrate;

b. ejecting the fluid fines tailings at the point into the air above the substrate to form dispersed fines tailings droplets comprising water; and c. allowing the dispersed fines tailings droplets to contact the substrate with inertial force at a contact velocity, the contact velocity sufficient to cause the dispersed fines tailings droplets to flatten on the substrate and release some of the water, forming partially dewatered fluid fines tailings.

In some exemplary embodiments of this aspect of the present invention, methods may further comprise a step after step c. of allowing the partially dewatered fluid fines tailings to further dry. Further drying may be achieved by ambient atmospheric conditions or application of heat to the partially dewatered fluid fines tailings.

The fluid fines tailings are preferably ejected through a nozzle to atomize the fluid fines tailings and thus form the dispersed fines tailings droplets.

In some exemplary methods, the point is rotated around a central axis during ejection of the fluid fines tailings to form the dispersed fines tailings droplets, The step of ejecting may comprise directing the fluid fines tailings generally upwardly. The step of ejecting may instead comprise directing the fluid fines tailings generally downwardly.

In some exemplary embodiments the fluid fines tailings are held within a tank and subsequently pumped to the point for ejecting.

In some exemplary embodiments, methods further comprise the steps of:

allowing the partially dewatered fluid fines tailings to further dry and form a dried tailings material; and subsequently ejecting further fluid fines tailings at the point into the air above the substrate to form further dispersed fines tailings droplets, and allowing the further dispersed fines tailings droplets to be deposited on top of the dried tailings material.

Some exemplary methods further comprise adding chemical additives to the fluid fines tailings prior to the step of ejecting the fluid fines tailings. The chemical additives are preferably metal halides.

Some exemplary methods further comprise adding gas to the fluid fines tailings prior to the step of ejecting the fluid fines tailings. The gas is preferably selected from a group consisting of air, nitrogen, carbon dioxide, natural gas, and mixtures thereof.

In some exemplary embodiments the substrate is movable and the method comprises the further step after step c. of moving the substrate such that subsequent ejecting of fluid fines tailings contacts a different portion of the substrate. The substrate may a continuous conveyor belt, or any other form of movable substrate such as a rotating disc.

Exemplary methods may further comprise the step after step c. of removing the partially dewatered fluid fines tailings from the substrate.

According to another aspect of the present invention, there is provided a method for treating a fines tailings, comprising:

spraying a layer of the tailings material on to a solid substrate;

after application of the layer on to the solid substrate, allowing the layer to dry;

re-application of the spray to yield a multiple layer tailings solid; and addition of optional chemical and gas additives to improve the dispersion and drying and consolidation of the tailings material after it is deposited on the solid substrate.

The chemical additives may consist of metal halides. The preferred composition is aluminum chloride or iron chloride. Furthermore, the gas additive may consist of air, nitrogen, carbon dioxide, natural gas, or mixtures thereof. The preferred gas is air.

In some exemplary embodiments of the present invention, the spray creates droplets that are large and impact the solid substrate with sufficient momentum to flatten the droplets on the solid substrate and separate water from the solids in the flattened droplet. In the large droplet embodiment, the preferred range of the droplet size is from 0.5 mm to 5 cm, preferably from 0.5 mm to 2.5 cm in diameter and the thickness of the impacted droplet (pancake) is from 100 microns to 3 mm, preferably from 100 microns to 1 mm.

Also, in some exemplary embodiments of the present invention, the spray creates a jet of droplets that are small and impact the solid substrate with sufficient momentum to flatten the droplets on the solid substrate and separate water from the solids in the flattened droplet. In the small droplet embodiment, the preferred range of the droplet size is from 1 to 500 microns, preferably from 1 to 200 microns in diameter and the thickness of the impacted droplet (pancake) is between 10 and 500 microns, preferably from 10 to 200 microns.

Preferably, sufficient time is allowed for the tailings layer to dry before the application of another layer of tailings material.

The tailings material may be heated prior to being sprayed.

In some exemplary embodiments of the present invention the spray nozzles are arranged in an array so that a large area can be sprayed with tailings material where sufficient time is allowed for the layer to dry before another layer is sprayed on top of the old dry layer.

In other exemplary embodiments of the present invention the spray nozzles are rotated so that the area is sprayed with tailings material in a repeated pattern so that sufficient time is allowed for the layer to dry before another layer is sprayed on top of the old dry layer.

In other exemplary embodiments of the present invention the tailings material is heated prior to being sprayed from the nozzle.

The spray may be applied onto a moving base substrate sheet and after the layer is dried, the layer is scraped off at a separate point. Additionally, gas may be flowed above the wet tailings layer to accelerate drying of the layer. The gas may be heated to further accelerate the drying of the layer.

One potential benefit of methods according to the present invention is that they may yield a solid product at the end of processing in a time period which is several orders of magnitude smaller than existing methods for treating tailings, e.g., heating methods, centrifugation methods. The preferred tailings to be consolidated are the mature fines tailings but the methods described herein can be used for any tailings providing the solid particles can fit through the selected nozzle. The nozzle can be designed to accommodate particular sizes of solid particles found in the target tailings.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention:

FIG. 1C illustrates a third exemplary embodiment of the present invention.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the invention to the precise form of any exemplary embodiment. Accordingly, the description and drawings are to be regarded in an illustrative, rather than a restrictive, sense.

The present description relates to treatment of tailings material to yield a dried layered product comprising the solid components of tailings material.

At present, there are no large-scale commercial processes that exist to consolidate and dry tailings materials.

The present invention takes a new approach in which additional forces, specifically inertial forces, are brought to bear on the separation of water from tailings material, with improvement of the ability for the tailings material to dry, as well as the generation of thin layered pancakes of tailings material that can be stacked on previously dried pancakes.

The ability for the tailings to dry relatively quickly, potentially within minutes after the layer is formed, is an aspect of the methods described herein.

The reduction of the volume of the tailings material as well as rejection of clear water is an aspect of the methods described herein.

Throughout this specification, numerous terms and expressions are used in accordance with their ordinary meanings.

Details are provided for the purpose of illustration, and the methods can be practiced without some of the features discussed herein. For clarity, technical materials that are known in the fields relevant to the present methods are not discussed in detail.

Figure 1A:
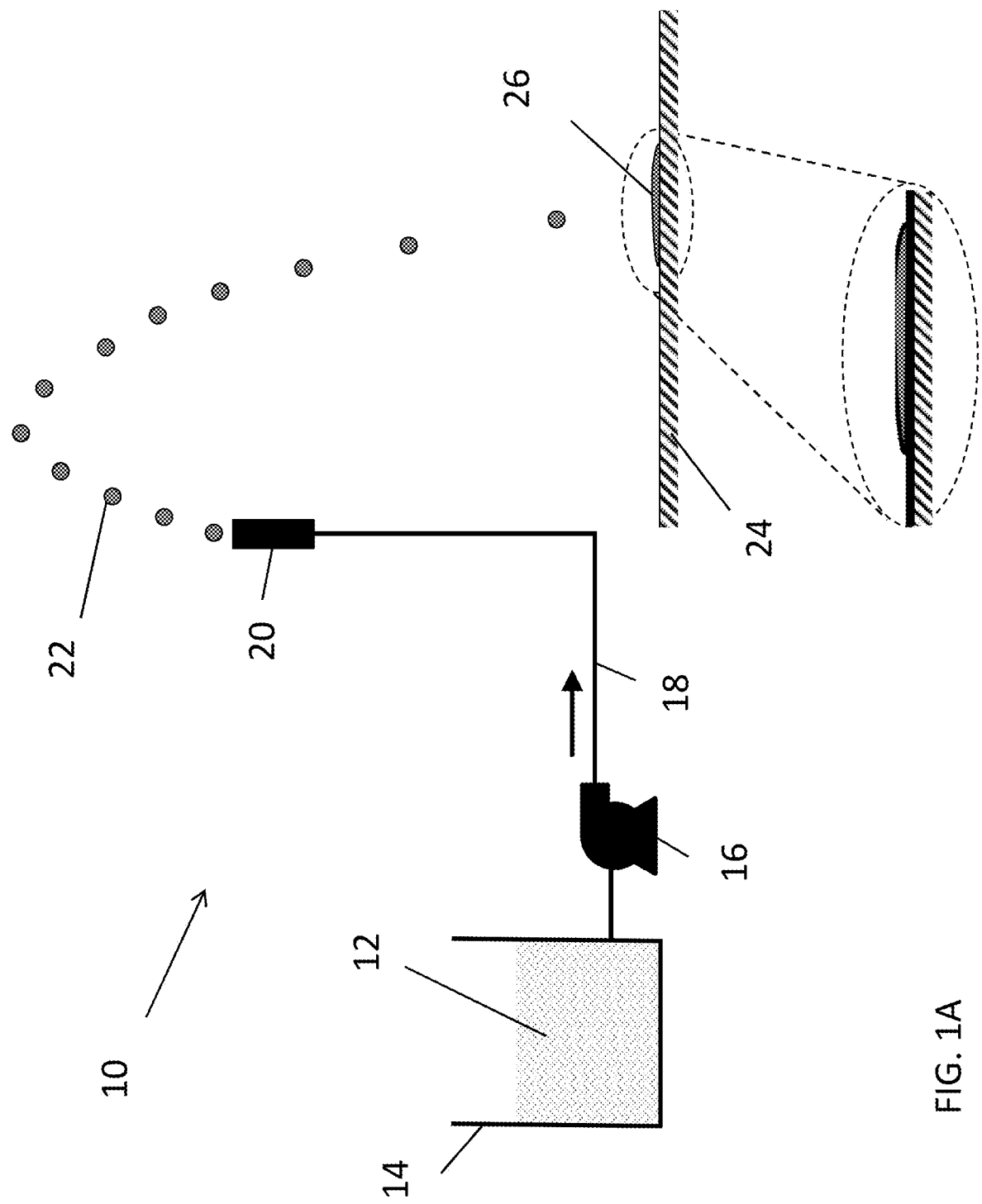
FIG. 1A illustrates a first exemplary embodiment of the present invention.

Turning now to the Figures, FIG. 1A illustrates a first exemplary embodiment 10 wherein tailings material 12 is transported from a tank 14 and pumped using a pump 16 through a transfer line 18 to a nozzle 20 which shoots or ejects the liquid tailings material 12 as droplets 22 into the air, which droplets 22 then consequently fall to the ground 24 with sufficient momentum to flatten them on the ground to create a tailings pancake 26. The source of the tailings material 12 can also be a tailings pond (not shown) rather than the tank 14. The nozzle 20 is shown as being supported at the end of the transfer line 18, but it can be supported above the ground by a tailings feed pipe (not shown). In this embodiment, the droplets 22 when emitted from the nozzle 20 have a diameter between 0.5 mm and 5 cm, and after they strike the ground the layer thickness is between 100 microns and 3 mm.

When the droplet 22 is shot into the air, some fraction of the water in the droplet 22 is removed due to evaporation from the surface of the tailings droplet 22 during the time that the droplet 22 takes in its flight from leaving the nozzle 20 up into the air and then down to the ground 24. When the droplet 22 reaches the ground 24, it impacts the ground 24.

The droplets 22 should have sufficient momentum when leaving the nozzle 20 so that they reach a height such that the momentum when reaching the ground 24 is sufficient to spread them on the ground 24 yielding a tailings pancake 26 (in this large droplet embodiment). The desired thickness for the wet tailings pancake 26 is between 100 microns and 3 mm and preferably from 100 microns to 1 mm in thickness. Furthermore, the momentum of the droplet 22 should be sufficient to separate the water and tailings solids on impact with the ground 24.

After some time, the thin tailings pancake 26 on the ground 24, potentially less than 10 minutes for a pancake 26 with thickness less than 1 mm, will dry. After the pancake 26 is dry, other droplets 22 can be sprayed on top of the dry pancakes 26.

Figure 1B:
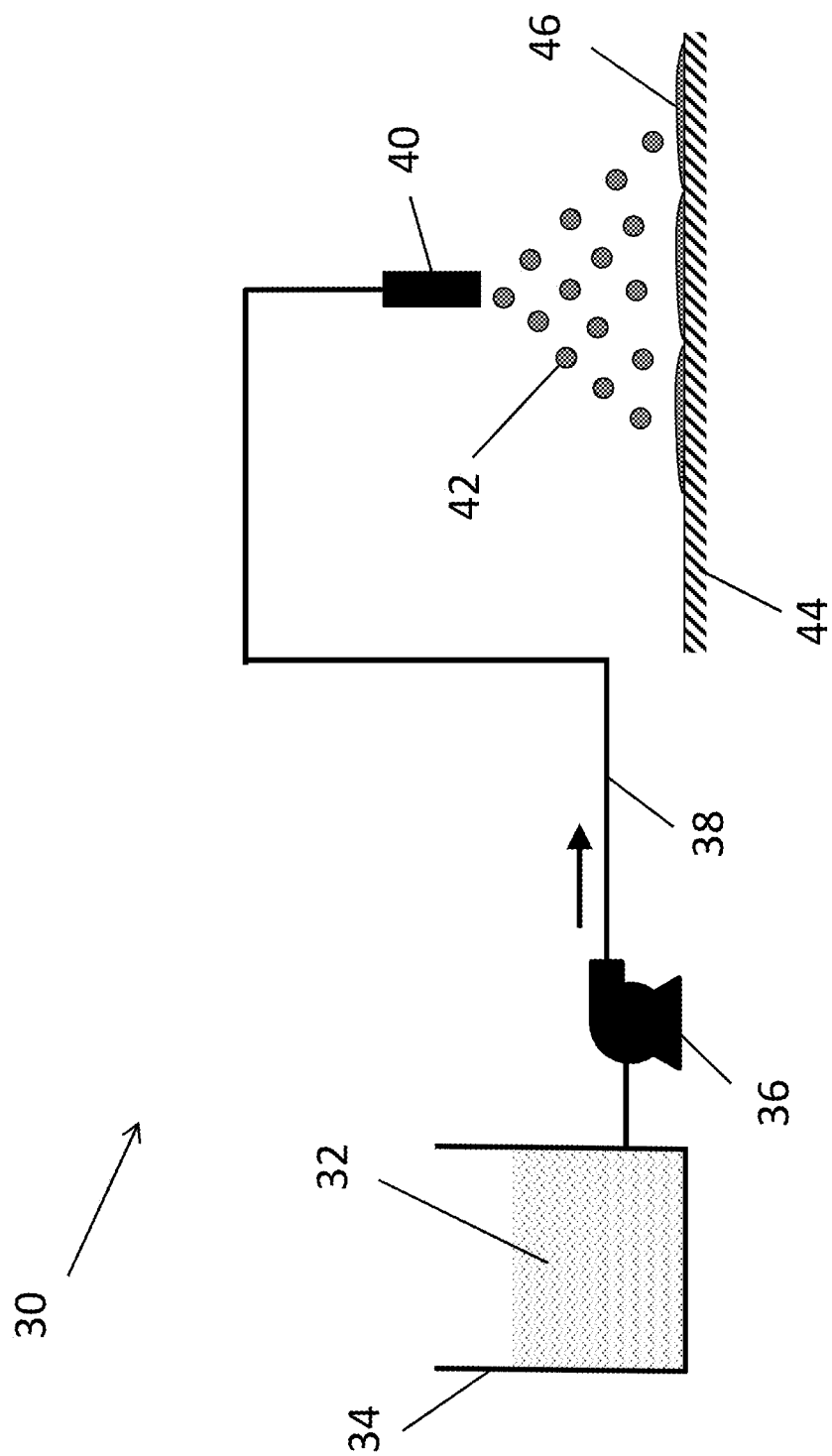
FIG. 1B illustrates a second exemplary embodiment of the present invention.

FIG. 1B illustrates a second exemplary embodiment 30 of the present invention, wherein fines tailings material 32 is housed within a tank 34, and transferred via a pump 36 through a transfer line 38 to a nozzle 40. A spray of tailings droplets 42 is emitted to the ground 44 via the nozzle 40 to yield a thin layer 46 of tailings on the ground 44 (in this small droplet embodiment). The size of the droplets 42 is between 1 and 500 microns and the thickness of the wet layer 46 on the ground 44 (or other solid substrate) is between 10 and 500 microns and preferably from 10 to 200 microns. In this embodiment, the nozzle 40 emits the spray of droplets 42 downwardly to impact the ground 44 (or other solid substrate), leaving the layer 46 of the tailings material 32 on the ground 44.

FIG. 1C illustrates a third exemplary embodiment 50 of the present invention, wherein an array of nozzles 60 is used to spray tailings droplets 62 on the ground 64, thereby forming flattened layers 66. The fines tailings material 54 is housed in a tank 52, and transferred by pump 56 through a transfer line 58 to the nozzles 60. The nozzle 60 arrangement can be in a square or any other regular or irregular configuration, e.g., triangular, square, rectangular, hexagonal, or as required by the topography of the ground 64.

Figure 1D:
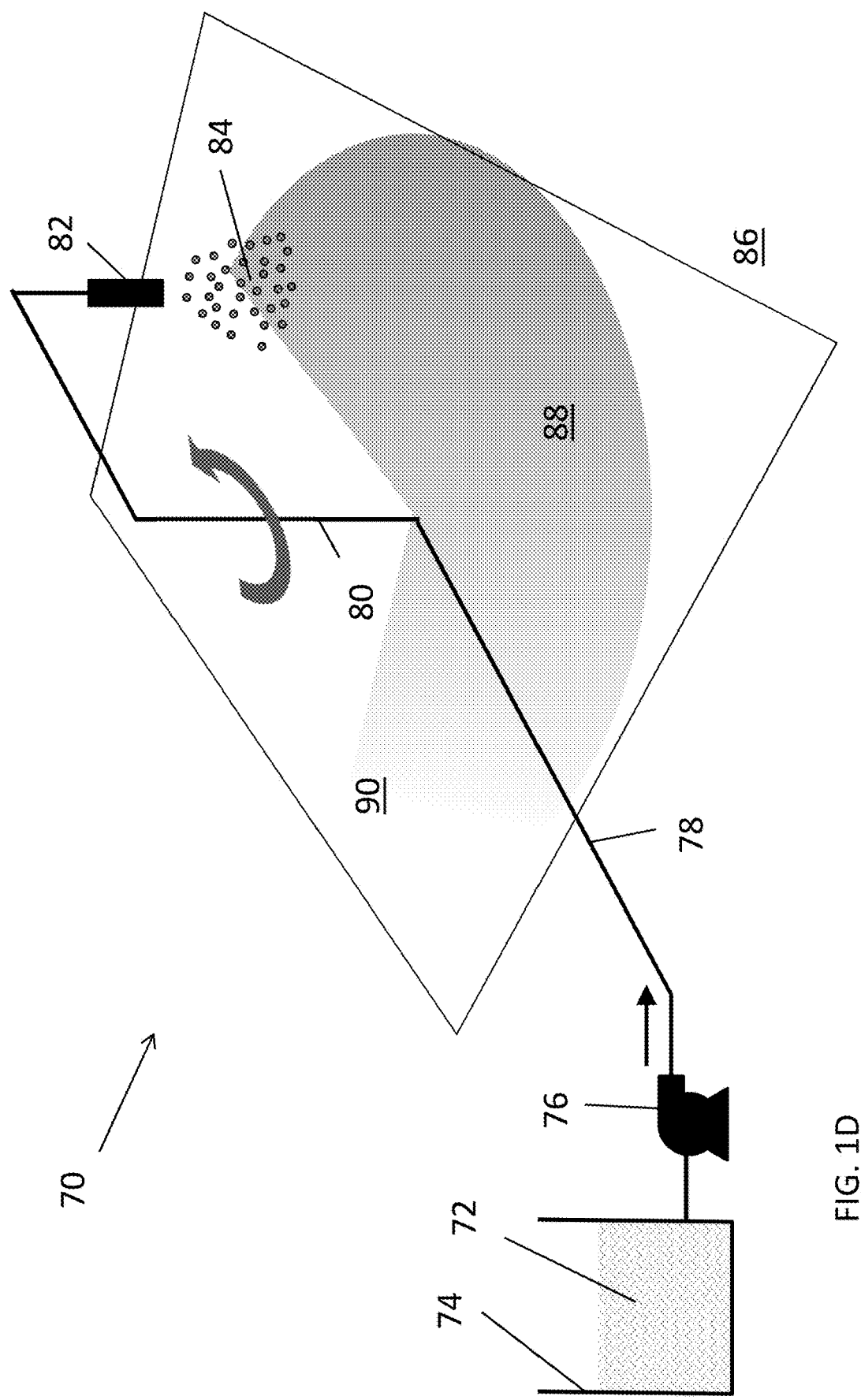
FIG. 1D illustrates a fourth exemplary embodiment of the present invention.

FIG. 1D illustrates a fourth exemplary embodiment 70 of the present invention, wherein a nozzle 82 is rotated to distribute tailings material droplets 84 around a nozzle feed pipe 80. Fines tailings material 72 is housed in a tank 74, and the transferred via pump 76 through a transfer line 78 to the nozzle feed pipe 80. The spray of tailings droplets 84 can be deposited on the ground 86 and dried to form a dried layer 90, and then droplets 84 can be deposited on top of the dried pancakes 90 as a subsequent wet tailings layer 88. Multiple layer of the pancakes 90 can thus be created as required. The nozzle 82 can be rotated so that it deposits wet pancakes on a portion of the ground 86 as it rotates, and the previously deposited pancakes are allowed to dry prior to a new layer being deposited on top of the now-dried pancakes.

Figure 2:
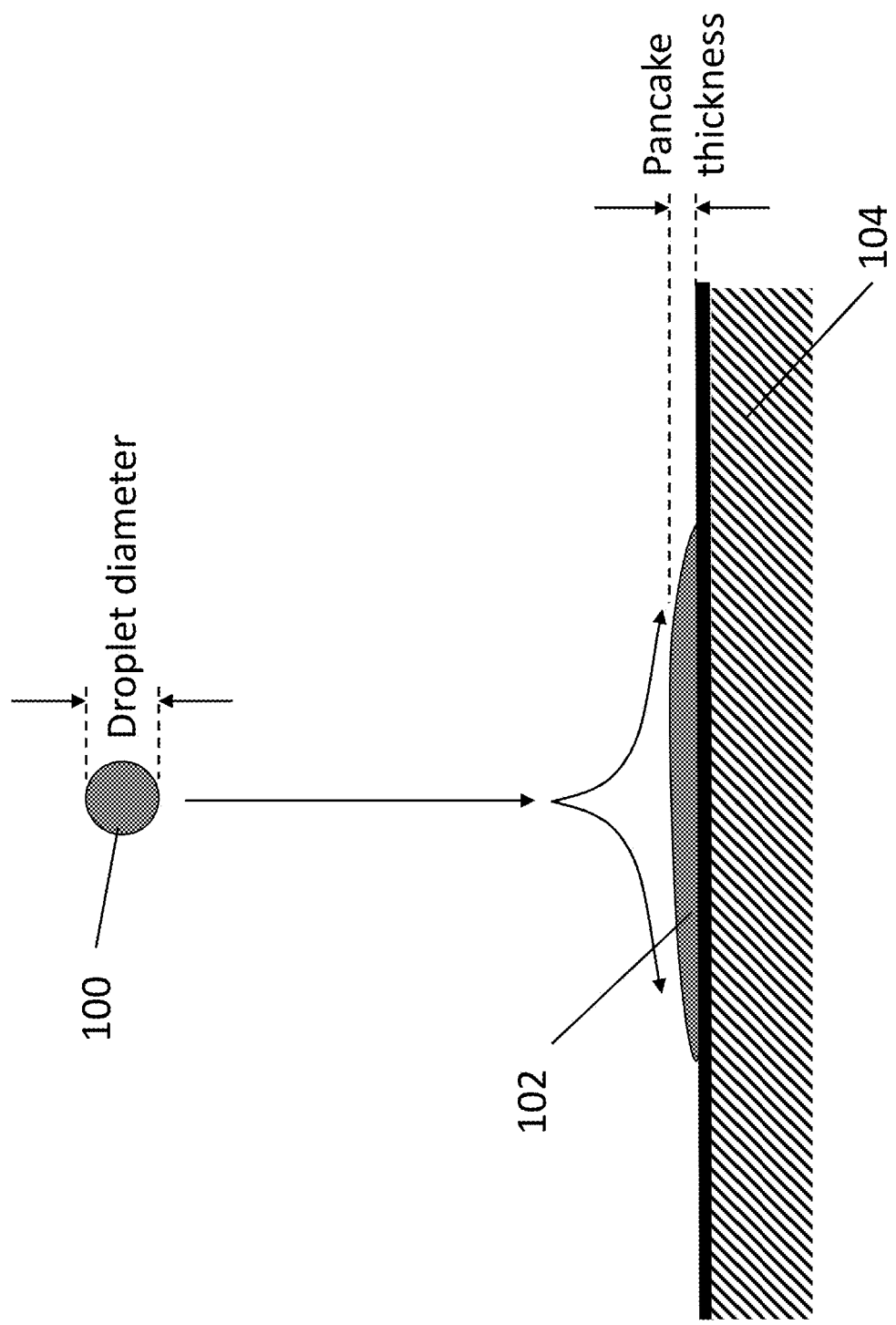
FIG. 2 illustrates a droplet before impingement/impact, and the droplet impinging the ground.

FIG. 2 illustrates the concept of the tailings droplets impacting the ground. In FIG. 2, a tailings droplet 100 of a certain diameter is dropped or ejected toward the ground 104, resulting in a flattened pancake 102 having reduced thickness but larger diameter. The momentum of the droplets 100 should be sufficient to yield a flattened pancake 104, preferably between 100 microns and 3 mm thick and more preferably between 100 microns and 1 mm thick, on the ground 104. The variables that control the momentum of the droplet 100 when it strikes the ground 104 include the mass of the droplet 100 and the velocity of the droplet 100 when it hits the ground 104. The nozzle configuration and fluid flow rate control the droplet 100 size and the height the droplets 100 reach above the ground if they are ejected upwardly before falling by gravity to the ground 104. The height the droplet 100 reaches above the ground 104 partially controls the velocity of the droplet 100 when it impacts the ground 104. The momentum of the droplet 100 should also be sufficient to separate some fraction of the water, preferably greater than 30%, from the tailings material when the droplet 100 impacts the ground 104. For flow from a nozzle aimed towards the ground 104, the distance between the nozzle and the ground is another variable affecting impact velocity. The momentum of the droplet 100 is preferably sufficient to not only flatten the droplet 100 to form the tailings pancake 102 on the ground 104, but also such that the difference of the densities of the components in the droplet 100 is sufficient to separate the water and solids upon impact. This improves the capability for the remaining tailings mud pancake 102 to dry. The force required to provide sufficient momentum for the droplet 100 to impact the ground can originate from gravity and/or inertia, e.g., from a spray jet.

Figure 3:
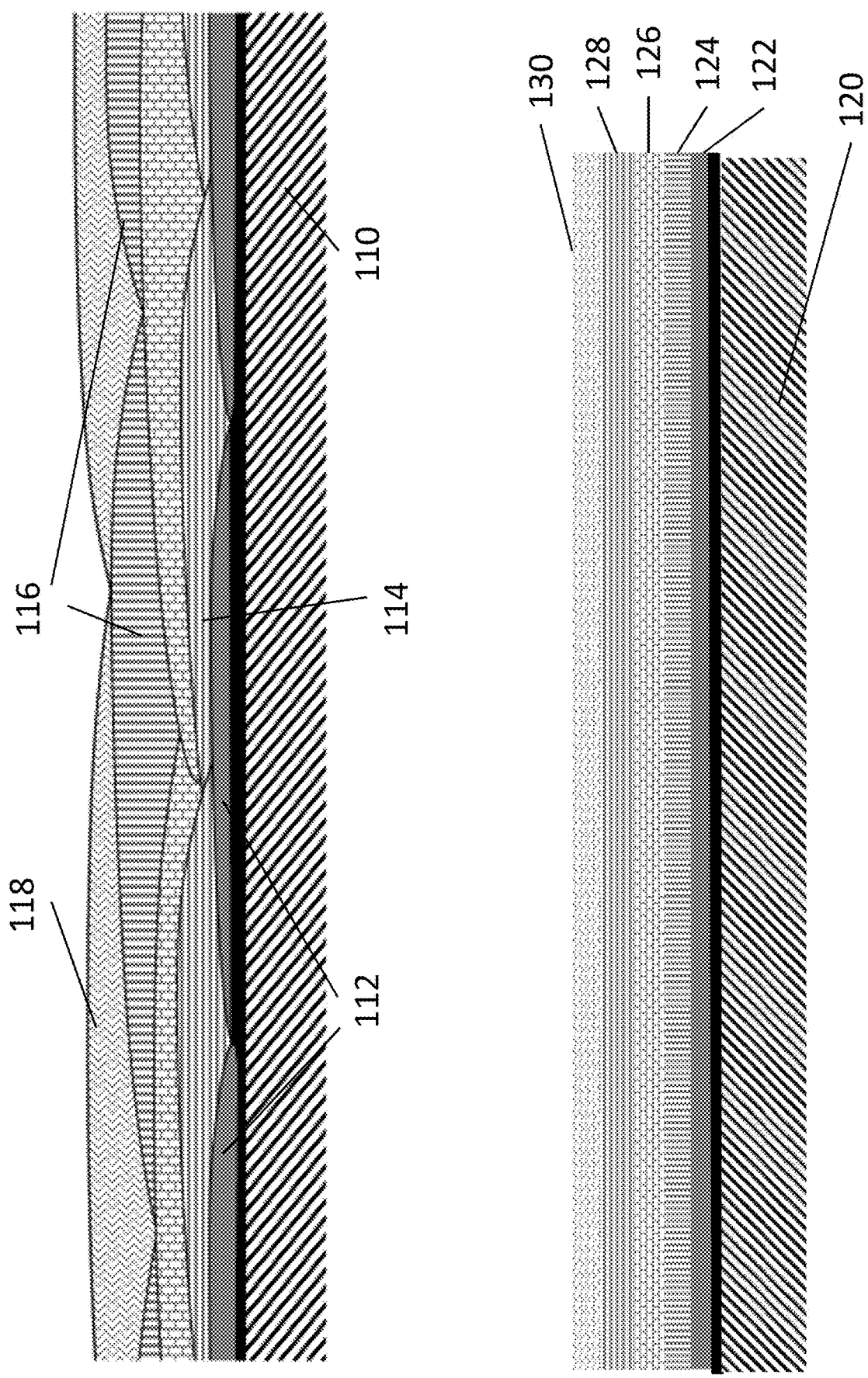
FIG. 3 illustrates multiple layers of tailings pancakes or continuous layers.

FIG. 3 illustrates two different arrangements of multiple layers of dried tailings pancakes. The top image illustrates an arrangement where droplets are layered as individual disconnected pancakes on the substrate 110, formed at different times as disconnected layers 112, 114, 116 and 118. The bottom image illustrates an arrangement where droplets merge and form continuous layers 122, 124, 126, 128 and 130 on the substrate 120. The large droplet method will tend to yield the individual disconnected pancakes of the top image, whereas the small droplet method will tend to provide continuous layers as illustrated in the bottom image.

Figure 4:
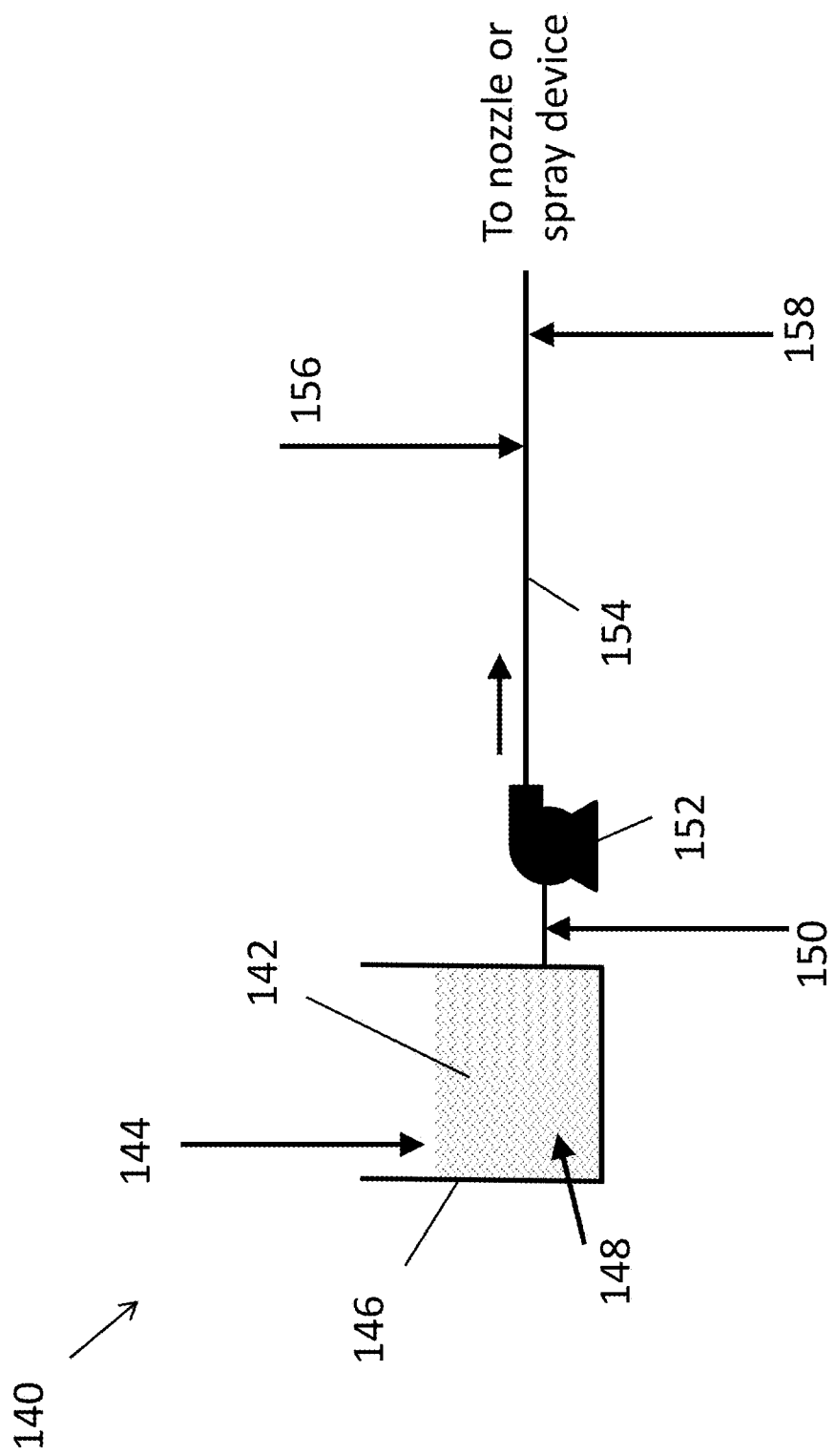
FIG. 4 illustrates a fifth exemplary embodiment of the present invention.

FIG. 4 illustrates a fifth exemplary embodiment 140 of the present invention, wherein chemical and gas additives are added to the tailings material before it reaches the nozzle. The fines tailings material 142 is housed in a tank 146, and both heat 148 and chemical additives 144 are applied. The treated fines tailings material 142 is then transferred by pump 152 through a transfer line 154. Further chemical additives can be added at 150 upstream of the pump 152. Gas additives can be added to the transfer line 154 at 156, as can additional heat at 158. The chemicals 144, 150 that can be added to the tailings material 142 prior to the spraying device (such as a nozzle, not shown in FIG. 4) include mixtures of metal halide (for example, MX where M=aluminum or iron or sodium or potassium or copper and X=fluoride, chloride, bromide, iodide) solutions with or without acid and/or base (to adjust pH as required). Other possible chemical additives include polymer or cellulose nanocrystals. The gas can be used to improve the capability to spray the tailings material 142 and disperse it in the air. Examples of gases that can be used include air, nitrogen, carbon dioxide, flue gas from combustion (mixtures of nitrogen and carbon dioxide), and natural gas (methane).

Furthermore, the tailings material 142 may be heated at 158 before it reaches the nozzle to accelerate the drying process. The temperature can be in the range of 10 to 99 degrees and is preferably in the range of 20 to 60 degrees C. so that the water in the sprayed tailings droplets does not completely evaporate before they reach the solid substrate or ground.

Figure 5:
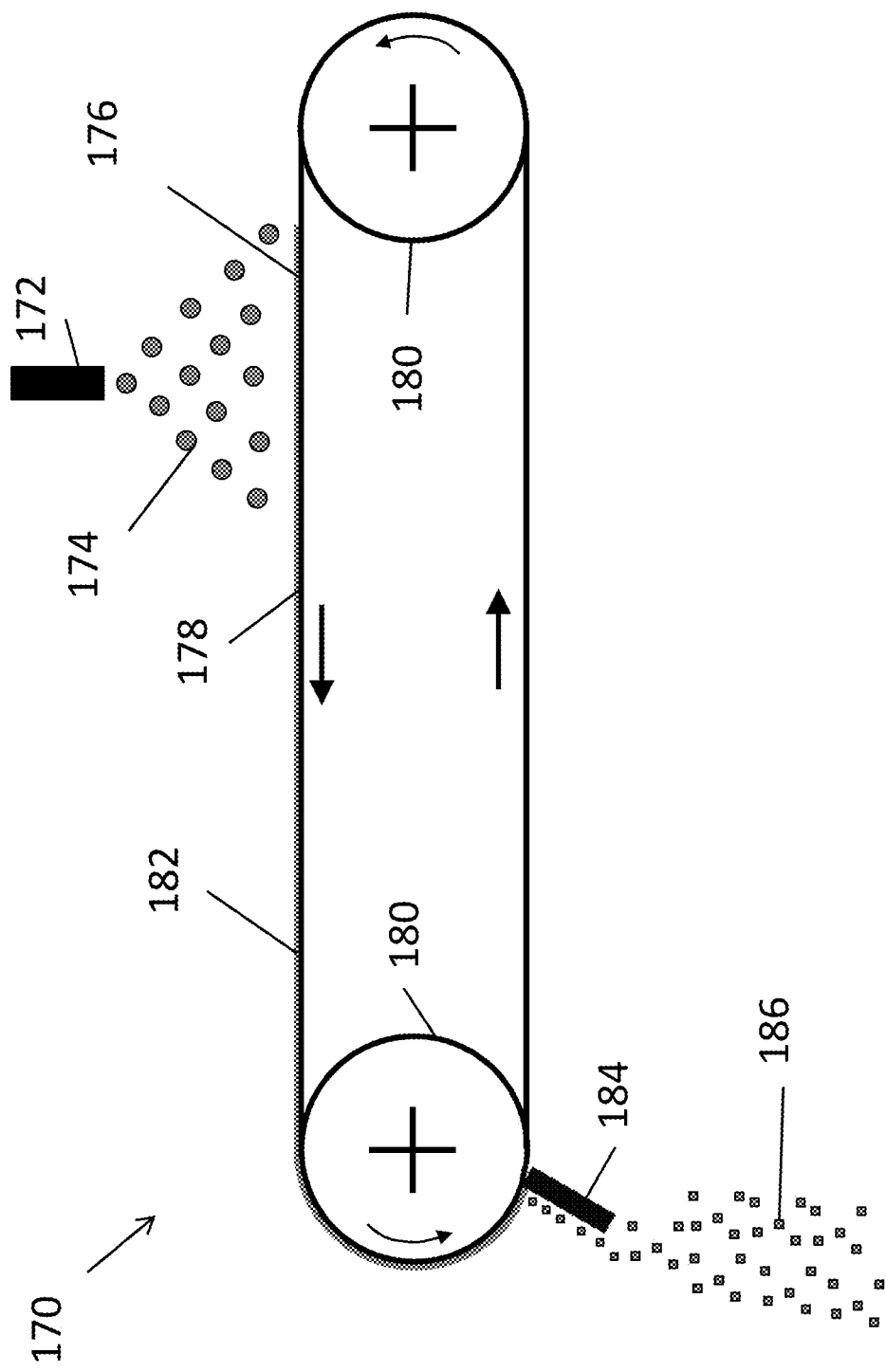
FIG. 5 illustrates a sixth exemplary embodiment of the present invention.

FIG. 5 illustrates a sixth exemplary embodiment 170 of the present invention, wherein the spray is made onto a moving base substrate sheet and the tailings pancakes are scraped off after drying at a separate point downstream of the spraying area. A nozzle 172 is used to spray droplets 174 onto a solid substrate 178, which in the illustrated embodiment is a conveyor belt surface rotated on rolls 180, the droplets 174 forming a wet tailings layer 176 on the substrate 178. As the belt moves the wet tailings layer 176 away from the nozzle 172, the layer 176 dries to form a dried tailings layer 182. The spray is preferably generated with droplet sizes between 1 and 500 microns. and the dried tailings layer 182 is then scraped off of the solid surface 178 by means of a scraper 184 adjacent the substrate 178, resulting in solid dried tailings material 186. In another embodiment, the tailings material droplets 174 are sprayed onto the dried layer 182 without scraping, with the dried layer 182 traveling all the way around until it is reintroduced to the area beneath the nozzle 172, until a sufficient thickness (which may be up to inches, preferably in the range from 1 to 5 inches) is realized and then the thick layer is scrapped off the solid substrate 178 by the scraper 184.

In some embodiments, the spray arrangement can be mounted on a vehicle such as a heavy truck, for spraying onto the ground surface (either through an upwardly or downwardly directed spray) as the vehicle moves across the ground surface.

In another non-illustrated embodiment, the spray is directly applied to the ground by using mobile spray devices yielding thin dry layers on the ground which are composed of multiple dried sprayed layers. This can be done in a linear arrangement in a field. In another non-illustrated embodiment, the spray can be directly issued over a truck bed for transport after deposition and drying of multiple layers of tailings pancakes. In another non-illustrated embodiment, gas or heated gas is allowed to flow above the wet tailings layer to accelerate drying of the wet tailings layer. In another non-illustrated embodiment, the backing solid substrate can be heated to accelerate drying of the wet tailings layer.

Figure 6A:
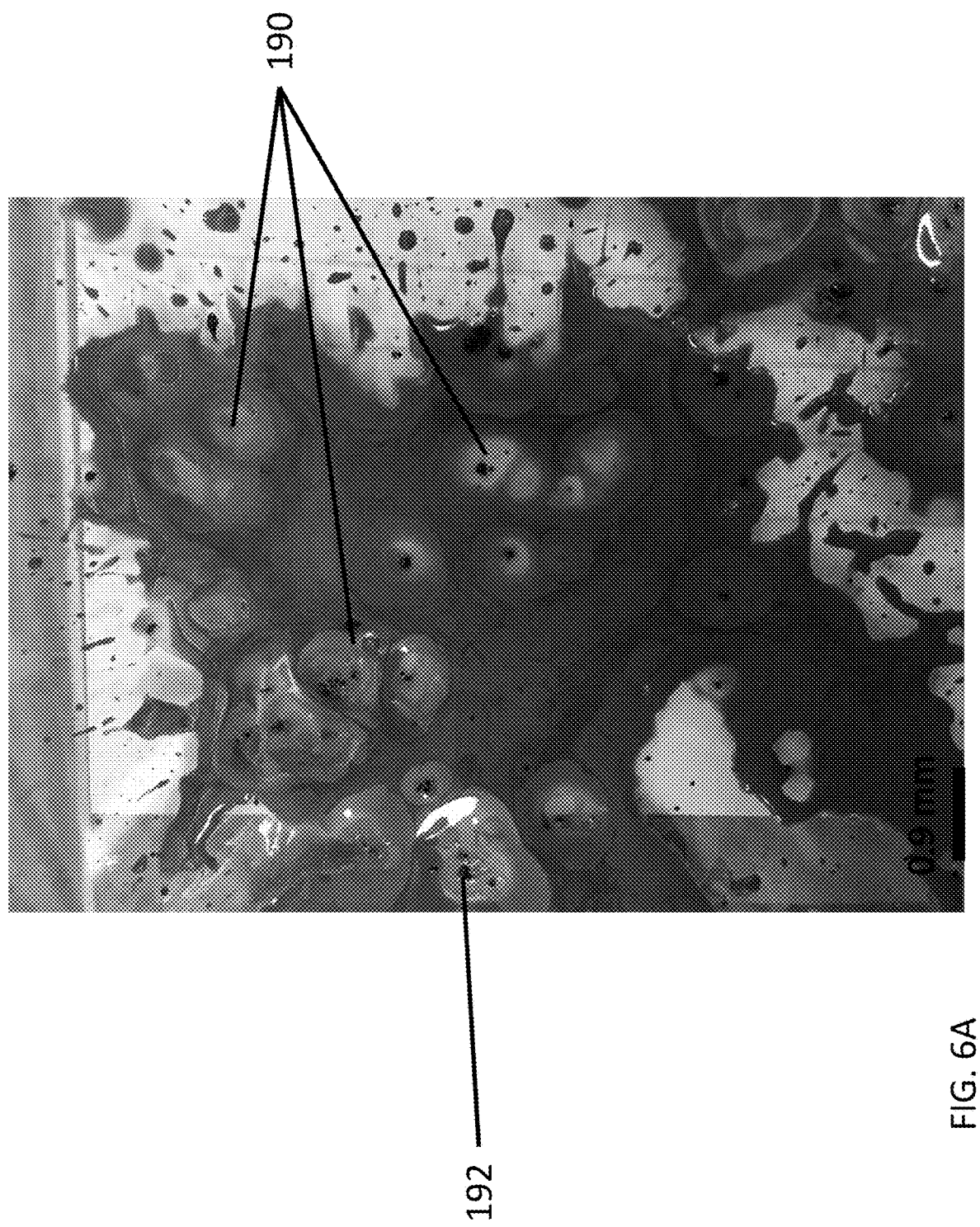
FIG. 6A is an image of a tailings material pancake after impact on a solid substrate.

FIG. 6A is an image of a tailings pancake after application on a solid surface. The image shows that the water is separated from the tailings solids during the impacting process. The dark material 192 is the solid tailings material and the water droplets 190 that result from the impact are indicated. The method separates the water 190 from the tailings solids 192 as part of the process.

Figure 6B:
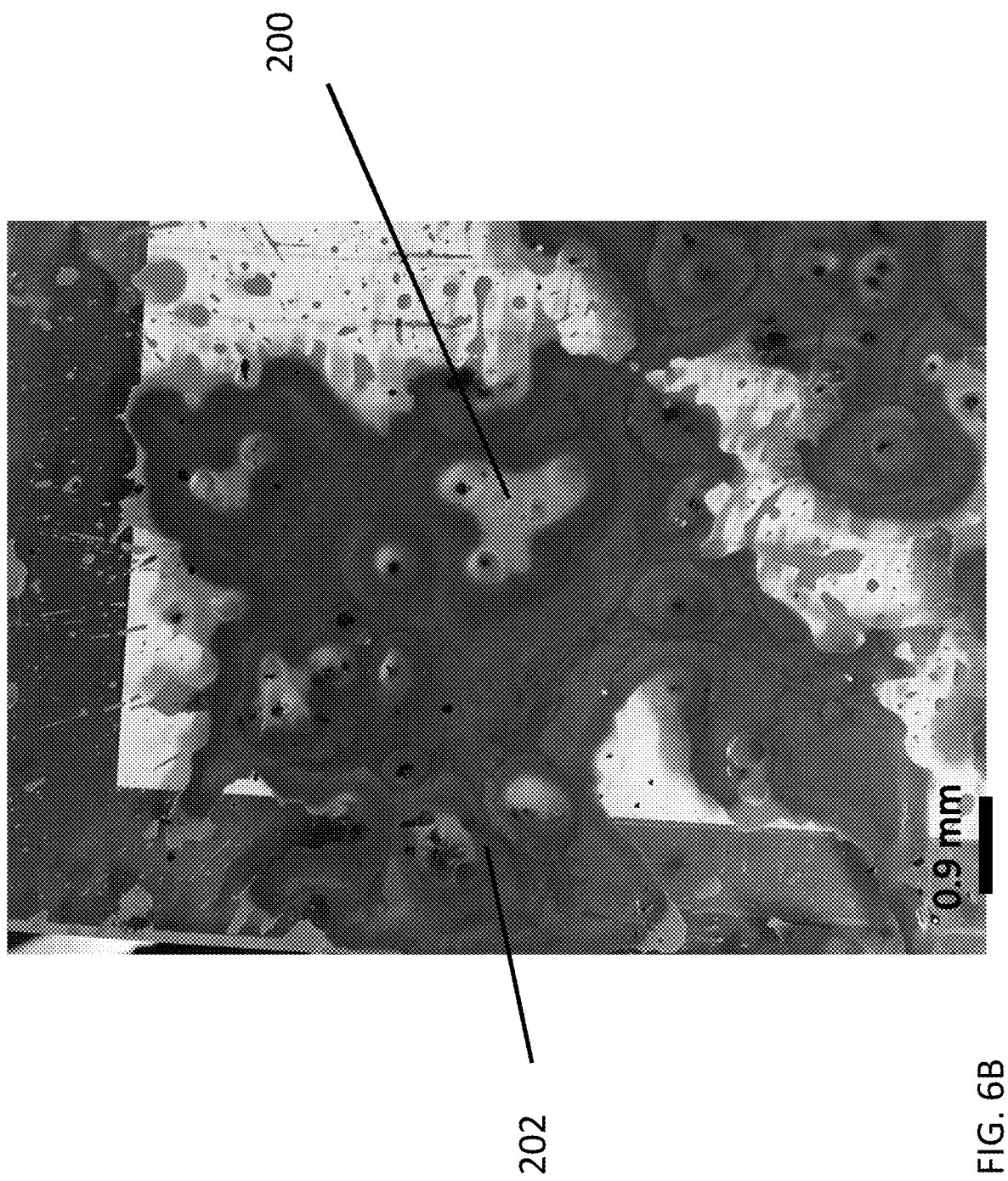
FIG. 6B is an image several minutes after the impact of tailings material on a solid substrate.

FIG. 6B is an image of the tailings pancake after an application and after passage of some time such as a few minutes, wherein the water droplets 200 have merged further promoting separation of the water 200 from the solids 202 within the tailings pancake. The image, when compared to that in FIG. 6A, reveals that some of the water droplets merge naturally into larger droplets 200.

Figure 7:
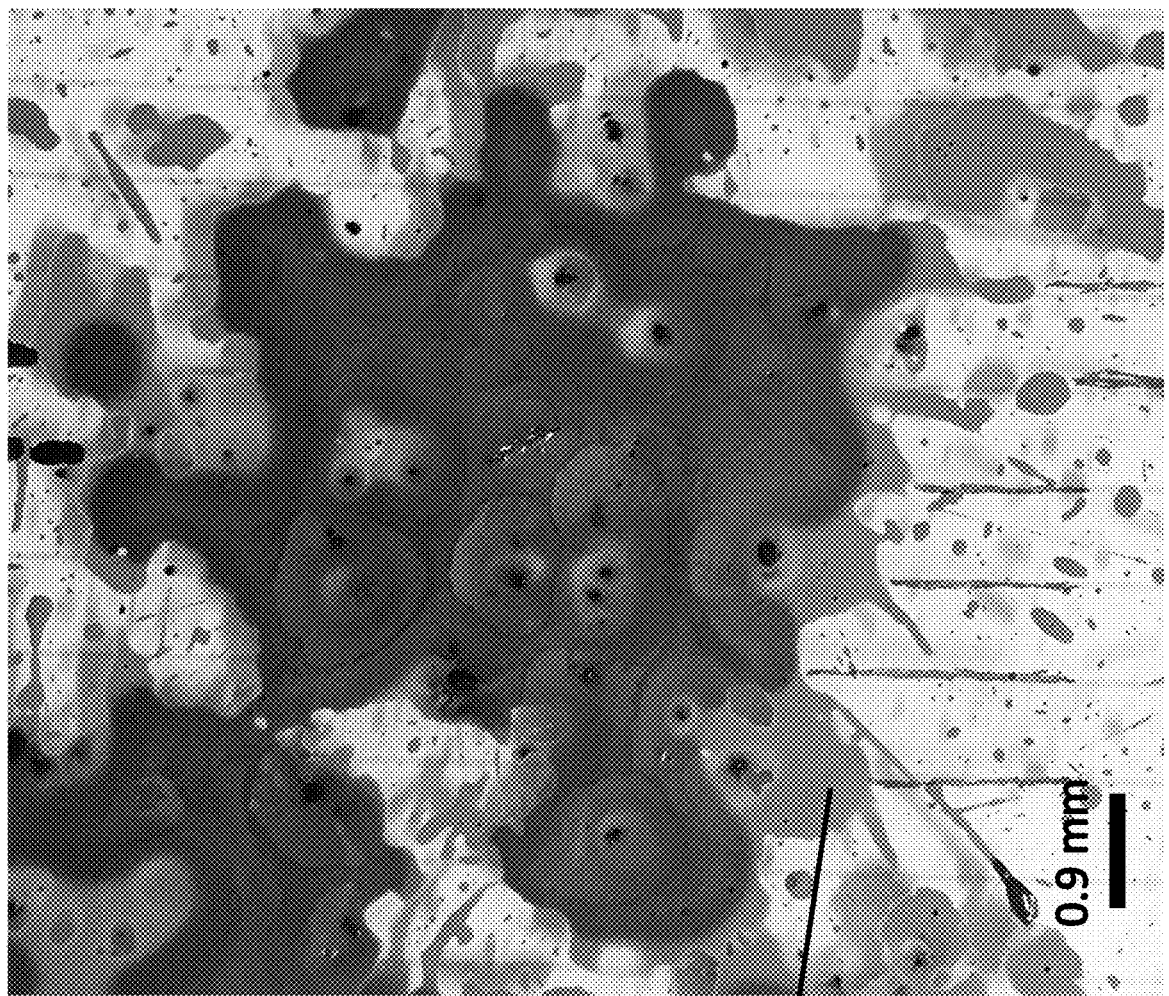
FIG. 7 is an image of a tailings material pancake on a solid substrate several minutes after impact revealing the drying of the tailings material on the solid substrate.

FIG. 7 is an image showing a tailings pancake several minutes after application to a surface, wherein the edges of the pancake are drying yielding a thin film 210 of dried tailings solids.

Figure 8:
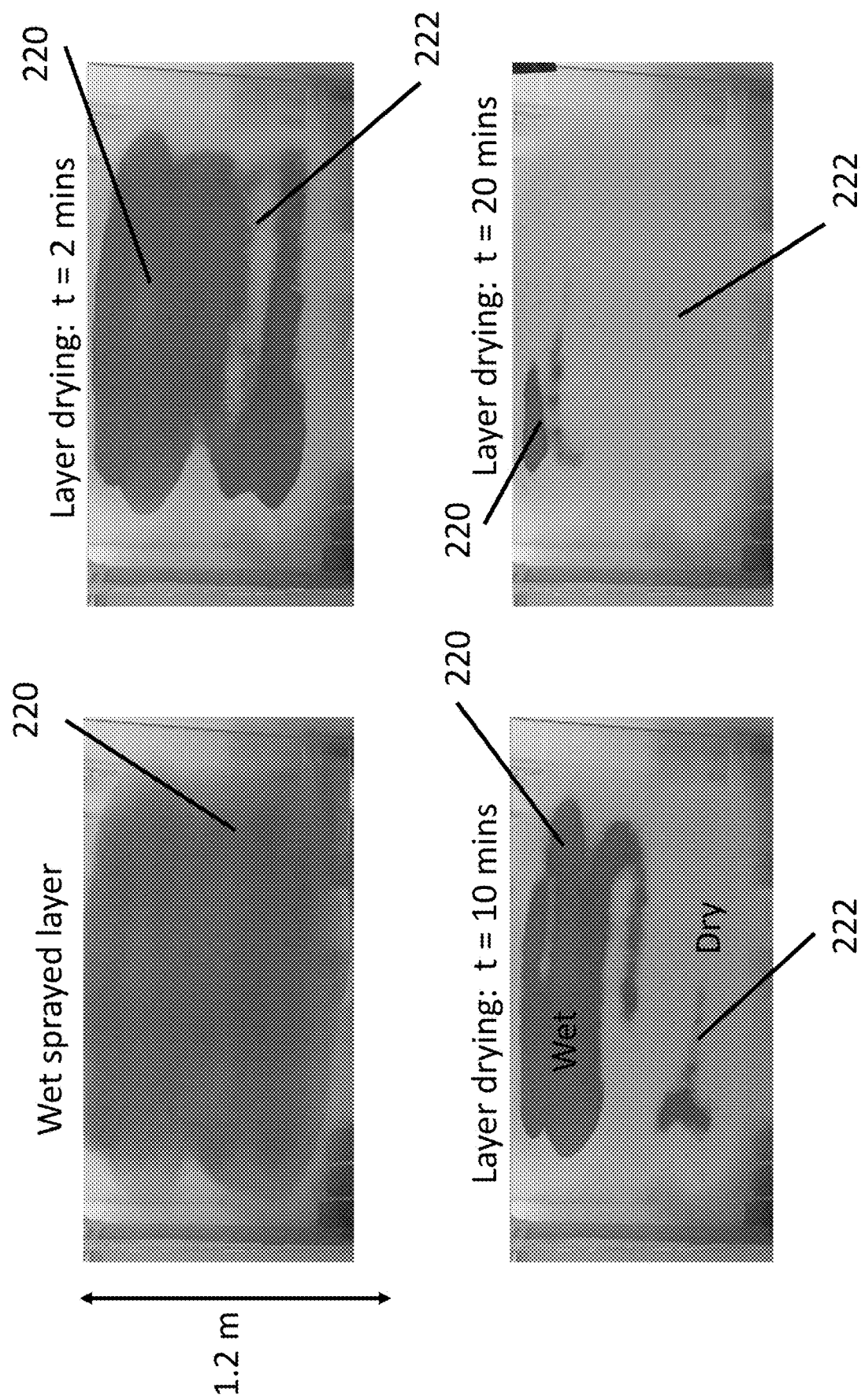
FIG. 8 is an image of a dried tailings layer (from the small droplet embodiment).

FIG. 8 presents a series of images showing the drying of a thin layer of tailings after it is sprayed on a solid substrate. The wet areas are numbered as 200, with the dried areas numbered as 222. The results show that the thin layer dries in about 20 minutes in this embodiment. In this embodiment, the surface is sprayed with tailings droplets with diameters between 5 and 200 microns. The thickness of the tailings pancake ranges from 5 to 50 microns after drying (wet pancake thicknesses between 10 and 100 microns).

Figure 9:
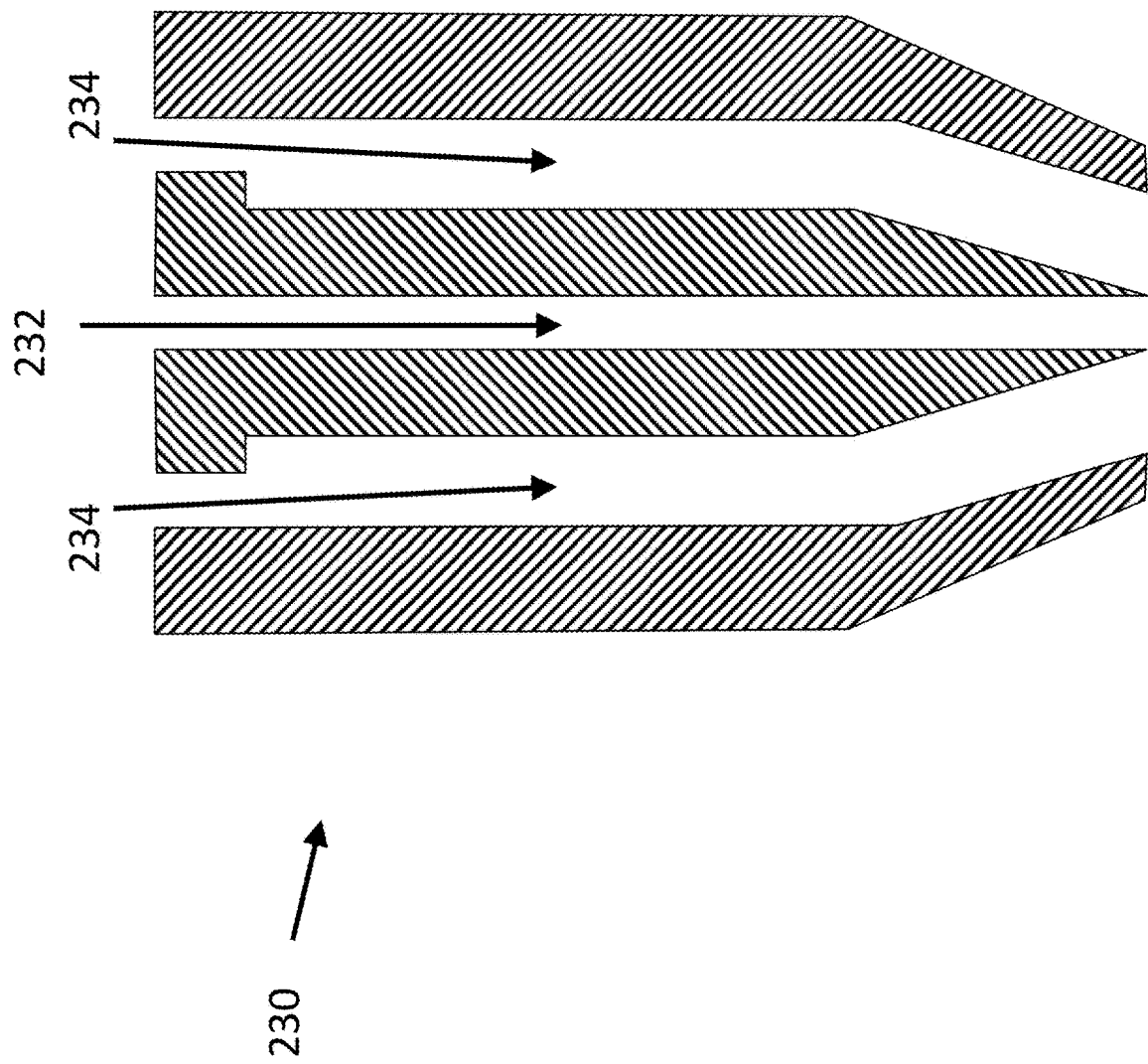
FIG. 9 is a simplified sectional view of a nozzle.

FIG. 9 presents a simplified section view of a nozzle 230 illustrating the inner tailings material tube 232 and an annular gas injection zone 234 surrounding the tailings material tube 232. The gas injection zone 234 can also be provided from one or both sides of the tailings material port. The tailings material is flowed through the inner tube 232 and gas is flowed through the annular space 234 surrounding the tailings material port. The gas helps to disperse (or atomize) the tailings material into droplets. The gas can consist of any one of combinations of air, carbon dioxide, nitrogen, and methane.

The spray device may consist of any form of nozzle or atomizer that yields droplets of tailings materials of a desired size.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A method for partially dewatering fluid fines tailings and forming a stack of dried and flattened layers, the method comprising the steps of:
   a. transporting fluid fines tailings that comprise first fluid fines tailings and second fluid fines tailings to a point vertically spaced above a substrate;
   b. ejecting the first fluid fines tailings at the point into the air above the substrate to form first dispersed fines tailings droplets comprising water;
   c. allowing the first dispersed fines tailings droplets to contact the substrate with inertial force at a contact velocity, the contact velocity sufficient to cause the first dispersed fines tailings droplets to flatten on the substrate and release some of the water in the first dispersed fines tailings droplets resulting in a first flattened dewatered layer less than 3 mm in thickness;
   d. allowing the first flattened dewatered layer to further dry to form a first dried flattened layer;
   e. ejecting the second fluid fines tailings at the point into the air above the first dried flattened layer to form second dispersed fines tailings droplets comprising further water;
   f. allowing the second dispersed fines tailings droplets to contact the first dried flattened layer with the inertial force at the contact velocity, the contact velocity sufficient to cause the second dispersed fines tailings droplets to flatten on the first dried flattened layer and release some of the further water, the release of the some of the further water resulting in a second flattened dewatered layer less than 3 mm in thickness; and g. allowing the second flattened dewatered layer to further dry on the first dried flattened layer thus forming the stack of dried and flattened layers.

2. The method of claim 1 wherein the further drying is achieved by ambient atmospheric conditions or application of heat to the first flattened dewatered layer and the second flattened dewatered layer.

3. The method of claim 1 wherein the first and second fluid fines tailings are ejected through a nozzle to atomize the first and second fluid fines tailings and thus form the first and second dispersed fines tailings droplets, respectively.

4. The method of claim 1 wherein the point is rotated around a central axis during ejection of the first and second fluid fines tailings to form the first and second dispersed fines tailings droplets.

5. The method of claim 1 wherein the step of ejecting comprises directing the first and second fluid fines tailings generally upwardly.

6. The method of claim 1 wherein the ejecting comprises directing the first and second fluid fines tailings downwardly.

7. The method of claim 1 wherein the first and second fluid fines tailings are held within a tank and subsequently pumped to the point for ejecting.

8. The method of claim 1 further comprising adding chemical additives to the first and second fluid fines tailings prior to the ejecting the first and second fluid fines tailings.

9. The method of claim 8 wherein the chemical additives are metal halides.

10. The method of claim 1 further comprising adding gas to the first and second fluid fines tailings prior to the ejecting the first and second fluid fines tailings.

11. The method of claim 10 wherein the gas is selected from a group consisting of air, nitrogen, carbon dioxide, natural gas, and mixtures thereof.

12. The method of claim 1 further comprising the step after step of removing the stack of dried and flattened layers from the substrate.

* * * * *